United States Patent Office 3,502,156
Patented Mar. 24, 1970

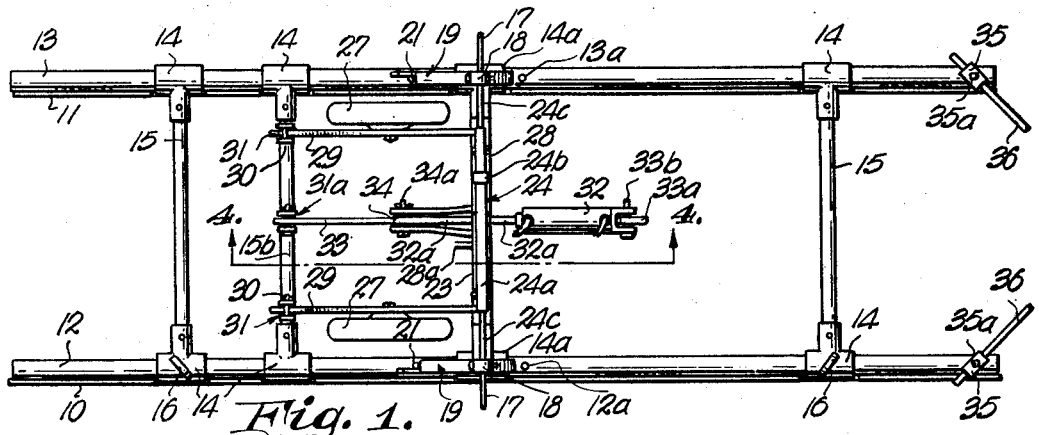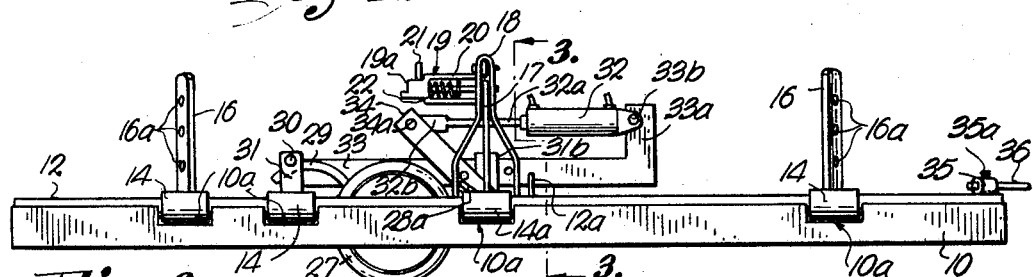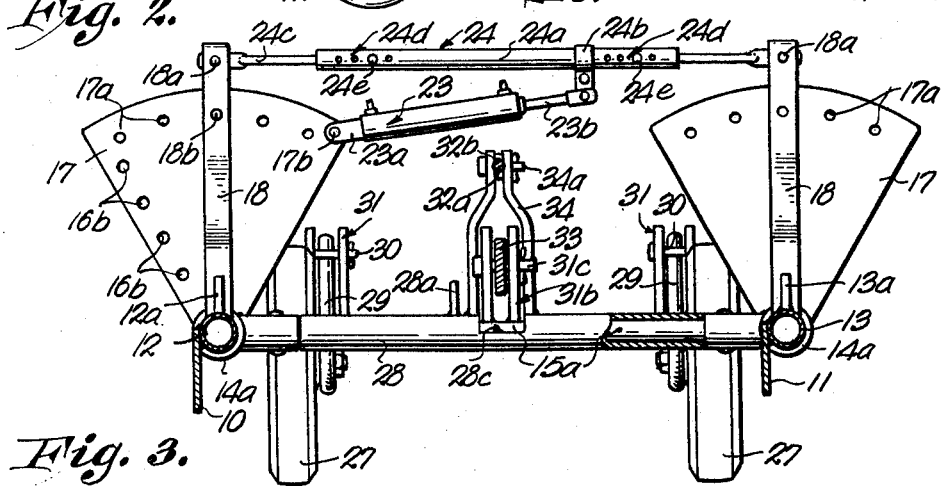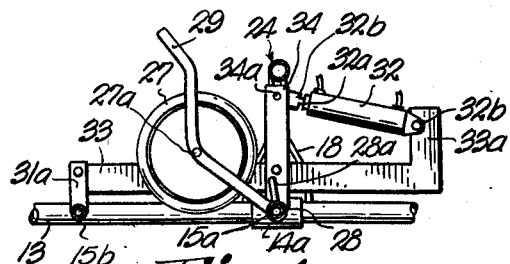
INVENTOR
Harold W. Sherman

3,502,156
LAND LEVELER
Harold W. Sherman, 444 Ohio St.,
Lawrence, Kans. 66044
Filed Feb. 15, 1967, Ser. No. 616,316
Int. Cl. A01b 31/00, 63/00
U.S. Cl. 172—660     10 Claims

ABSTRACT OF THE DISCLOSURE

A land leveler having at least two transversely extending blades which are so interconnected with one another that their relative angularity with respect to the ground may be individually or simultaneously adjusted from a relationship in which the angle is acute into and through a parallel condition to an obtuse angularity.

BRIEF SUMMARY OF THE INVENTION

A primary feature of the invention is to provide a uniquely constructed land leveler and clod buster. The breaking up of clods and the moving of high field areas into low ones in fields to be under cultivation is now an integral part of many farming operations. The instant invention is constructed to be dragged behind a tractor or other suitable prime mover, thusly performing the above-mentioned soil preparation as same is moved through the field. The two blades extend transversely to the direction of pull and contact the soil with their lower edges thereby facilitating the leveling operation.

The blades are carried on elongate cylinders referred to as blade supports and are interconnected by spacer rods, the blade supports being rotatable relative to the spacers. Upstanding arcuately apertured and lockable quadrants are connected with both the fore and aft blade supports. A yoke member straddles each quadrant and as such are further interconnected by an adjustable length rod and a hydraulic cylinder. This arrangement allows the relative angle of contact between the blade edges and the soil to be hydraulically changed either in parallel or separately. Separate thrust levers are provided to manually and individually vary the blade angulation.

A sleeve, circumscribing one of the spacer rods, carries a mounting means for the associated wheels. The use of wheels is generally preferable to skids and their mountings are so constructed relative to the spacer rods that they can be selectively lowered into a ground engaging position so as to support the leveler and permit it to be towed from an end portion (as opposed to the usual operating pull direction) from one field to another. Accordingly, the versatility and portability of the instant invention are important features thereof.

An object of the invention is to provide a rugged, inexpensive and versatile land leveler which is capable of reducing small irregularities in terrain to a relatively smooth field surface, same being then more easily tilled with conventional farm implements. The subject land leveler features include the capability of moving small high field areas into low ones and breaking up large clods as an integral part of providing relatively smooth field surfaces.

Another object of the invention is to provide a land leveler of the character described whose efficiency operation is enhanced due to the independent and/or simultaneous angular adjustability of the soil contacting blades.

Another object of the invention is to provide a land leveler of the character described wherein the angularity of each soil contacting blade is uniquely changed and locked, thereby resulting in a labor saving adjustability feature.

A further object of the invention is to provide a land leveler which may be transported in endwise fashion. An important feature of the invention resides in the unique wheel mounting and the means for pivoting same in a leveler supporting ground contacting position.

Other and further objects of the invention, together with the features of novelty appurtenant thereto, will appear in the course of the following description.

DETAILED DESCRIPTION

In the accompanying drawing, which forms a part of the specification and is to be read in conjunction therewith, and in which like reference numerals indicate like parts in the various views;

FIG. 1 is a top plan view of the leveler;

FIG. 2 is a front view of the leveler with the wheels in the ground contacting position for endwise transport;

FIG. 3 is a sectional view of the leveler taken along line 3—3 of FIG. 2 in the direction of the arrows and showing the adjustable lockable quadrants in conjunction with the tubular and sleeved construction of the blade supports and spacer rods; and FIG. 4 is a partial front view of the leveler showing a wheel mounting arrangement and the position that the wheels take when raised to allow the leveling operation.

Turning now more particularly to the drawing, transversely extending blades 10 and 11 are weldedly attached to and depend from elongate cylindrical blade supports 12 and 13, respectively. Both blade supports 12 and 13 are rotatably positioned within a plurality of T-shaped collars 14. These collars 14 are provided with an inwardly extending portion for the interconnection of spacing rods 15.

As most clearly seen in FIG. 2, blades 10 and 11 are appropriately slotted at properly spaced intervals (see slots 10a) along their upper portion to permit the rotative movement of the blade supports relative to the stationary connecting collars 14. Blade supports 12 and 13 have upwardly extending lever arms 12a and 13a, respectively, which may be engaged by a short length of pipe and rotated (with the respective blade supports and blades) relative to collars 14. This manual method of changing the angulation of the blades relative the connecting collars is generally in lieu of a hydraulically actuated means to be described later.

A pair of vertical hitching posts 16 are welded to the end collars 14 on the forward portion of the leveler and turn slightly inwardly. Each post is apertured at 16a to facilitate in the connection of a chain or hitching cable. The third hitching point 16b is provided by the apertures along the front edge of the forward one of a pair of vertically mounted quadrants 17.

As suggested above, the angulation change of the blades may be performed hydraulically rather than manually. Quadrants 17 provide several locked positions for the blades as they are arcuately moved relative to the quadrants. These quadrants are weldedly attached at their lower ends to the centrally located collars, both fore and aft, said collars hereinafter designated by the numeral 14a (see FIG. 3).

Yokes 18 straddle each quadrant 17 and are welded to the associated blade support on each side of collars 14a. For example, the forward yoke is welded to blade support 12 and the rear yoke is welded to blade support 13. The yokes 18 as seen in FIG. 2, are shaped somewhat like an upside down Y with the sides of each yoke near the upper arc portion of a respective quadrant being pressed together and vertically aligned. This portion of each yoke contains two pairs of aligned apertures, the upper pair 18a facilitating the connection of an adjustable length rod 24 and the lower aperture 18b facilitating the locking of each blade support at a particular preselected angle relative to the corresponding quadrant.

The upper end portion of each quadrant is apertured with five selectively spaced apertures 17a, same being individually alignable with the lower aperture pair 18b in yoke 18 by movement of each yoke and respective blade support relative to a stationary mounted quadrant. A hydraulic cylinder 23, having clevised end 23a is fixedly connected to the aft portion of the forward quadrant 17 by inserting locking pin 17b through apertures in clevised end 23a and an appropriate aligned aperture in the subject quadrant. Hydraulic piston 23b is then connected to the center cylinder portion 24a of the adjustable length rod 24 by band 24b. Two end rod members 24c are slidably and lockably positioned within cylinder 24a and are fixedly pin connected at the end portions through aligned apertures 18a in each yoke. The two series of apertures located near the end portions of cylinder 24a and generally indicated by the numeral 24d shown in FIG. 3, allow either or both rods 24c to be locked by a removable pin 24e for non-slidable movement relative to cylinder 24a, as will be discussed later.

The above-mentioned locking of each yoke 18 adjacent a preselected aperture 17a in quadrant 17 is facilitated by a spring loaded locking mechanism 19 for each quadrant (see FIG. 2). This mechanism includes a U-shaped housing 20 having its open end welded to the side of yoke 18 above and below lower aperture pair 18a in each yoke. A locking pin 21 is spring biased forwardly into a locking position by compression spring 22. The rear portion of pin 21 is bent at a right angle to the direction of movement of said pin. This angled portion may be rotated to contact plate 19a thereby maintaining same in an open or unlocked position. When in a locked position, locking pin 21 is rotated 90° out of contact with plate 19a and spring 22 forces same through the aligned apertures 18a in yoke 18 and through one of the selected apertures 17a in a quadrant 17. Each yoke and its respective quadrant may be locked relative to each other due to the selective placement of locking pin 21 in any one of the five locking apertures 17a.

When it is desired to change the location or angulation of the blades relative to their respective quadrants, the upturned end of locking pin 21 may be pulled out of locking engagement and the blade supports either hydraulically or manually moved to a new relative position, the locking pin then being relocated through a newly selected quadrant aperture 17a for proper blade angulation.

Referring onec again to FIG. 3, cylinder 23 is operable to hydraulically extend, hold or retract its associated piston 23b and is equipped with conventional hydraulic lines (not shown) for the activation thereof. Yokes 18 may be simultaneously hydraulically moved (thusly inherently moving blades 10 and 11) by leaving connecting pins 24e in their rod fixing position, unlocking locking mechanisms 19 and activating hydraulic cylinder 23. This arrangement eliminates sliding relative movement of rods 24c within cylinder 24a and allows the parallel movement of blades 10 and 11. For example, if locking pins 21 are moved to their respective above-mentioned opened position, the activation of hydraulic cylinder 23 to extend piston 23b results in the rearward movement of rod member 24 and a simultaneous and parallel movement of yokes 18 to the right or in a clockwise direction, as seen in FIG. 3. Blade supports 12 and 13 likewise turn in a clockwise direction (FIG. 3) within collars 14, thereby angling the blades 10 and 11, respectively, towards the front of the leveler. Activating hydraulic cylinder 23 to retract piston 23b results in an opposite movement of the rod member 24 and the yokes, blade supports and blades, thereby angling the blades (10 and 11) to the rear of the leveler.

Either of the two blades, 10 or 11, may be individually moved by selectively removing one of the rod fixing pins 24e. If, for example, the forward rod fixing pin 24e is removed, the relative movement of cylinder 24a over the fixed rod 24c connected to the forward yoke 18 is then possible, assuming the aft yoke is in an unlocked position relative to its respective quadrant 17. The activating of hydraulic cylinder 23 to retract piston 23b will slide cylinder 24a to the left, as seen in FIG. 3, over rod 24c, thusly moving aft yoke 18 and blade support 12 in a counterclockwise direction. This, of course, has the effect of angling blade 11 to the rear of the leveler while not effecting the angulation of blade 10. The extending of piston 23b will have an opposite effect on blade 11, thereby moving the edge of the blade in a clockwise direction to facilitate the angling of the blade to the front of the leveler. It should be understood that both of the rods 24c extend inwardly of cylinder 24a to permit slidable relative movement of cylinder 24a in either a fore or aft direction.

The removing of the aft rod fixing pin 24e and a reinsertion of the forward pin allows the cylinder member 24a to move over the aft or rear rod 24c in a manner similar to that described above so that the extension of piston 23b will angle blade 10 toward the front of the leveler and retraction of the piston will angle the blade to the rear of the leveler while the angle position of the rear blade 11 will remain unchanged.

In each of the above-mentioned examples, it is assumed that locking pins 21 do not prohibit the movement of yokes 18 and that the hydraulic cylinder operates to hold the blades at their desired positions. Once the desired operative positions have been hydraulically obtained, it is then possible and sometimes desirable, to return locking pin 21 to assure the operative position of the blades relative to the leveler.

As mentioned in the "Brief Summary of the Invention," the leveler may be transported on wheels in an endwise manner. To facilitate this movement, wheels 27 are movably mounted relative to the spacer rods 15 so that the entire leveler may either be supported by the wheels or the wheels entirely removed from engagement with the ground. The latter would be the case when the leveler is in its working position. The centrally located spacer hereinafter referred to as 15a (FIG. 3), which interconnects between collars 14a, has a rotatable sleeve or cylinder member 28 positioned thereon extending between the fore and aft blade supports 12 and 13, respectively.

A pair of pivotal wheel supports 29 are weldedly attached at each end portion of sleeve 28 and are appropriately formed in the shape of a spread apart V-shape. Axle 27a extends through the lower portion of the V, and wheels 27 are mounted thereto. The end opposite the welded end of wheel support 29 is in a locked operative position when its upper surface contacts holding pin 30. When it is desired to move the wheels from the "up" position shown in FIG. 4, to the ground contacting position, pin 29a is removed and the upper end wheel supports 29 are pivoted downwardly. The pivoting of wheel supports 29 turns sleeve 28 in a counterclockwise direction (FIG. 4), until the outer end of supports 29 are positioned within apertured upright brackets 31 that have been weldedly affixed to the adjacent spacing rod referred to as 15b. With the ends of wheel supports 29 interiorly of brackets 31, connecting pins 30 are inserted above support 29 in brackets 31 with a cotter key insuring the connection.

The selective movement of wheels 27 into and out of ground engaging position may be accomplished by applying a short length of pipe against lever arm 28a or by the use of hydraulic cylinder 32. Hydraulic cylinder 32 is mounted for wheel or leveler lifting operation on an elongate angle frame 33. Frame 33 is supported between spacing rods 15a and 15b by upright brackets 31a and 31b, respectively. Pins 31c extend through both the brackets and the frame 33, thusly securely holding same. (Note in FIG. 3 that sleeve 28 is slotted at 28b around bracket 31b, thereby allowing the unrestricted rotative movement of the sleeve.)

The upturned portion of the frame 33a is connected to the right hand end of cylinder 32 (FIG. 2) by pin 33b and the piston 32a of hydraulic cylinder 32 connected to a yoke 34 by pin 34a and connecting plate 32b. This yoke (34) extends from and is weldedly connected to sleeve 28. The length of piston rod 32a is selected so that when extended to its full length, yoke 34 and sleeve 28 along with its associated appendages are pivoted counterclockwise, as seen in FIG. 2. The full extended length of piston rod 32a properly orients both wheel supports 29 relative to their respective brackets 31 for connection therewith and puts wheels 27 in proper ground contacting position. Likewise, when fully retracted, piston rod 32a pulls yoke 34 in a clockwise direction, thereby removing wheels 27 from a ground engaging position so as to not interfere with the land leveling operation. A pin (not shown) 29a may then be inserted through horizontal flanges on yoke 34 and under frame 33 to secure the wheels in their retracted position.

A pair of cylindrical shaped rod holding brackets 35 are mounted on the right end of the land leveler as seen in FIGS. 1 and 2. These brackets are welded directly to blade supports 12 and 13 and are angled so that their outer ends face toward each other. Towing rods 36 are designed to be placed therein and secured by means of pins 35a. Alternately the rods may be completely removed when not in use for towing. The angulation of the brackets thereby results in overlapping towing rods, when extended an appropriate distance, and provide a means (not shown) for engagement with a tractor or the like. Once hitched to the tractor via rods 36, the land leveler may be easily transported in an endwise manner when wheels 27 are in the ground contacting position.

The operation of the subject land leveler may be best explained by considering the following example. Consider the situation where it is desired to transport the land leveler from a tool shed, through various gates, to a tillable field for leveling work. Assuming wheels 27 are locked in the ground engaging position, the leveler may be hitched directly to a tractor via rods 36 as discussed above, for endwise movement. Accordingly, shed doors and gates may be easily negotiated regardless of the operative span of the blades. Once the leveler has arrived at its working destination, the tractor is unhitched from towing rods 36 and the leveler made ready for the leveling operation.

In order to properly set the blades, each locking pin 21 is generally removed from locking engagement with a quadrant aperture 17a of its associated quadrant 17. With locking pins 21 removed, the blades 10 and 11 may be moved in parallel relationship to each other or singly to different angular ground contacting positions. As mentioned above, the movement of the blades may either be done hydraulically or manually.

It is sometimes desirable to have the forward blade 10 engaging the soil by extending forwardly or at an acute angle relative to the vertical axis of the leveler. In order to facilitate this angular relationship, locking pin 21 in the forward yoke 18 is removed from engagement with quadrant 17, e.g. locking pin 21 is pulled out of contact with the aligned apertures 17a and 18b in the subject quadrant and yoke. If it is desired to hydraulically change the angulation of blade 10, then the appropriate hydraulic valve controlling the position of piston rod 23b is activated so that the rod is extended. The extending of rod 23b pushes cylinder member 24a to the rear on aft rod 24c, thusly rotating blade 10 forwardly on the leveler. Locking pin 21 may then be replaced, blade support 12 having been thusly rotated within collars 14 so that the lower edge of blade 10 will contact the soil at an angle to the vertical. Rear blade 11 may be singly moved in a similar manner by the removal of forward pin 24e and hydraulically moving cylinder 24a on forward rod 24c of the adjustable rod member 24.

The performance of the land leveler is controlled by the angulation of the blades with respect to the ground. Since the forward blade has a tendency to dig into the soil more than the aft blade, forward blade 10 is usually set perpendicular or at an angle to the rear while aft blade 11 is angled relatively more forwardly. This blade setting allows each blade to move approximately the same amount of soil under most operative conditions.

Returning now to the preparatory steps for the utilization of the leveler, the wheels will be raised from their ground engaging position. Pins 30 will now be removed from their supporting brackets and wheel supports 29 raised and locked in the position shown in FIG. 4. The raising may be done hydraulically or by inserting a short length of pipe over lever arm 28a to facilitate the clockwise rotation of sleeve 28 as seen in FIGS. 1 and 2. When used hydraulically, the appropriate valves are activated to retract piston 32a inwardly of hydraulic cylinder 32. Accordingly, the retraction of piston 32a pulls yoke 34 in a clockwise direction, as seen in FIGS. 1, 2 and 4.

After the blades are set and the wheels raised, chains or towing cables may be positioned in hitching post apertures 16a at the third hitching point 16b on the forward quadrant 17. Utilizing the upper hitching aperture position on hitching posts 16 will place the weight of the leveler substantially on the forward blade 10 thusly allowing and providing for a deeper "bite" into the soil. Alternatively, lower positions may be selected so as to transfer less weight to the forward blade 10 thereby decreasing the forward bite.

Once the leveler is appropriately set and connected to the tractor, the operator may drag the leveler through a prospective tillable field at an angle to the ridges or furrows, and change the angle of the blades as desired. The leveler cuts off the high portions of the field, and fills in the lower portions during the operation thereof. Blade 10, of course, makes the initial contact and blade 11 provides the final grading. The leveler may be dragged through the field as many times as necessary with various blade angulation settings, depending on the need, to successfully eliminate the unevenness in the terrain and/or break up any large clods which may be on the surface thereof.

Once the leveling operation is completed, the tractor is unhitched from the forward hitching points (posts 16) and moved to the transporting end adjacent towing rods 36. Hydraulic cylinder 32 may be actuated to extend rod 32a, rotate sleeve 28 and thusly wheel support 29, and place wheels 27 in a ground contacting position. This action lifts the leveler from the ground as wheels 27 come into the ground contacting position. With the leveler raised and wheels 27 locked with brackets 31 by pins 30, the leveler is now ready for endwise transportation to other fields or the tool shed.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In a land leveler, the combination of a pair of elongate parallel ground engageable blades, mounting means rigidly attached to said blades, a plurality of spacer members extending continuously between said blades, connector means fixed to the respective ends of said spacer members, said blade mounting means pivotally secured to said connector means for pivotal movement of said blades about axes substantially parallel with said blades, releasable locking angle adjusting means associated with said mounting means of each blade for locking the same at a plurality of angular positions with respect to the ground and with respect to each other, said locking means including a quadrant member rigidly fixed to one of said connector means of each blade, said quadrant having a plurality of apertures therein, said apertures in each quadrant providing a plurality of lockable positions for its respective blade mounting means relative to said spacer members, means connected to a mounting means of each blade and operatively associated with one of said quadrant apertures to lock said blade in one of said positions, and hydraulic pivoting means on said land leveler operable to pivot said blades when said locking means are released.

2. A land leveler as in claim 1 wherein said pivoting means includes an adjustable rod member connected between said locking means, said rod member being adjustable in length thereby changing the angular position of said blades when said rod length is changed.

3. The invention as in claim 1 wherein said pivoting means includes an adjustable rod member connected between said locking means, said rod member being movable relative to said spacer members, thereby changing the angular position of said blades when said rod is moved.

4. The invention as in claim 2 wherein a hydraulic cylinder having a movable piston is connected between said locking means and said adjustable rod member, said piston position being operable to change the effective length of said rod member.

5. The invention as in claim 3 wherein a hydraulic cylinder having a movable piston is connected between said locking means and said adjustable rod member, said piston movement being operable to move said rod member.

6. The invention as in claim 1 wherein each said quadrant member is fixedly connected to said spacer members and wherein said interconnected means includes by a yoke member fixedly connected to a respective mounting means, said yoke being operable to act as a lever arm thereby facilitating the pivoting of said mounting means relative to said quadrant member.

7. The invention as in claim 7 wherein said pivoting means including an adjustable rod member is connected between said yokes, said rod member being movable and adjustable in length to effect the pivoting of said blades.

8. The invention as in claim 1 wherein said leveler includes at least one wheel pivotally mounted relative to one of said spacer members.

9. The invention as in claim 8 wherein said leveler includes a hydraulically operated means for controlling the pivotal movement of said wheel.

10. The invention as in claim 9 wherein said wheel is fixedly attached to a rotatable sleeve, said sleeve being mounted over one of said spacer members, a hydraulic cylinder having an extendible piston, said cylinder fixedly attached relative to said one of said spacer members, said sleeve being rotatable thereon thereby facilitating the movement of said wheel in accordance with the movement of said piston.

References Cited

UNITED STATES PATENTS

| 2,614,346 | 10/1952 | Howard | 172—199 |
| 843,025 | 2/1907 | Miller | 172—660 |
| 924,311 | 6/1909 | Boyd | 172—660 |
| 2,421,772 | 6/1947 | Brundage | 172—240 |

FOREIGN PATENTS

| 165,740 | 10/1955 | Australia. |
| 580,881 | 8/1959 | Canada. |

ROBERT E. PULFREY, Primary Examiner

STEPHEN C. PELLEGRINO, Assistant Examiner

U.S. Cl. X.R.

172—240, 422